April 5, 1949.  W. E. SMITH  2,466,497
AUTOMATIC WELDING MACHINE

Filed Feb. 21, 1946  3 Sheets-Sheet 1

INVENTOR.
WILLIAM E. SMITH.
BY
Louis W. Clement
ATT'Y.

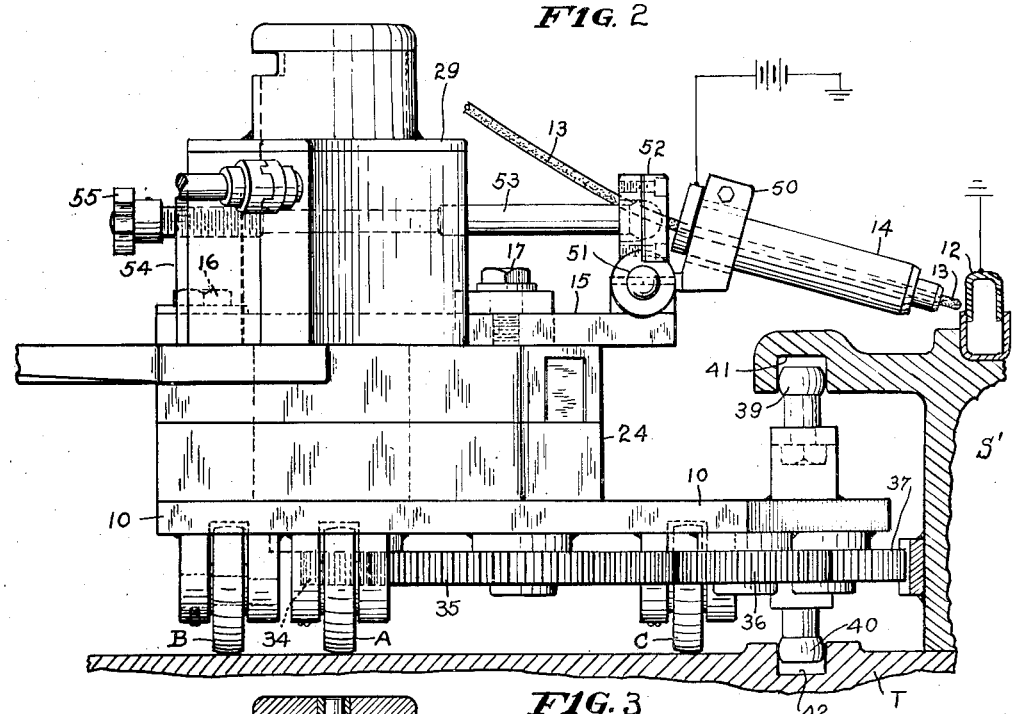
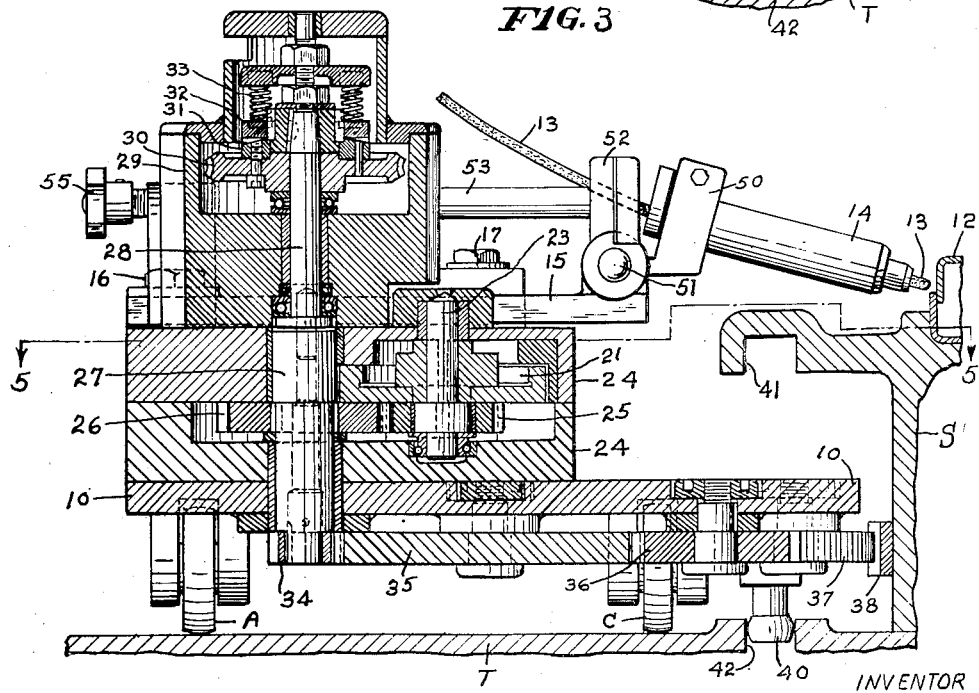

April 5, 1949.  W. E. SMITH  2,466,497
AUTOMATIC WELDING MACHINE

Filed Feb. 21, 1946  3 Sheets-Sheet 3

INVENTOR
WILLIAM E. SMITH.
BY Louis W. Schmitt ATT'Y.

Patented Apr. 5, 1949

2,466,497

UNITED STATES PATENT OFFICE 2,466,497

AUTOMATIC WELDING MACHINE

William E. Smith, Detroit, Mich., assignor to The Midland Steel Products Company, Cleveland, Ohio, a corporation of Ohio Application February 21, 1946, Serial No. 649,337

6 Claims. (Cl. 219—8)

This invention relates to automatic welding machines and an important object of the invention is to provide means for causing a welding apparatus to traverse the work and to weld the same at predetermined intervals; the mechanism being constructed to double the output of the machine over welding continuous seams in the work.

Broadly, the invention contemplates moving a welding instrumentality over the work and at certain intervals at a speed in excess of the speed of travel at which it can effectively weld, so that during such intervals of speed, the welding instrumentality travels so rapidly that it cannot weld, and so therefore "skips" or omits welding during these intervals of this high speed travel.

Other objects and advantages of the invention will become apparent during the course of the following description.

In the accompanying drawings forming a part of the application and wherein like numerals are employed to designate like parts throughout the several views, Fig. 1 is a top plan of the apparatus embodying the invention.

Fig. 2 is a transverse section of the same taken on the line 2—2 of Fig. 1,

Fig. 3 is a transverse section of the same taken on the line 3—3 of Fig. 1,

In my prior Patent No. 2,288,032 granted June 30, 1942 is disclosed apparatus including a carriage for moving a welding instrumentality to follow work contours and deposit weld material in a continuous seam at a high rate of travel. The present invention provides means for also moving the welding instrumentality relative to the carriage, in order that the welding instrumentality will weld at intervals by alternately omitting or skipping the welding of the joints at regularly spaced intervals lengthwise of the joint and welding only at intervals while doubling the speed of the carriage, thereby enabling output of the machine to be doubled, while still producing a joint or seam possessing the requisite strength for the particular work in hand. This is accomplished by doubling the carriage travel speed of the aforesaid patent so that the carriage traverses the work in one-half the time required by that of the patent, and by controlling the movement of the welding instrumentality relative to the carriage travel, to reduce the speed of the welding instrumentality at intervals to weld the work, and then to increase travel speed of the welding instrumentality whereby it will not weld the work at intervals while catching up with the carriage travel to start another welding cycle. Thus, the present machine finishes welding the work with spaced apart welds in the joint, in one-half the time required by the machine of the aforesaid patent to lay a continuous weld.

This is accomplished by providing a carriage 10 propelled on three rollers A, B and C, lengthwise of the stationary work 12, which latter may be of any type to receive treatment. The work shown herein by way of example is a side rail of an automobile frame, as in the aforesaid patent, and its treatment in this example consists in welding the two joints between a pair of nested channel sections with overlapping edges to form them into an elongated box section side rail. However, it will be understood that the work may consist of flat plates or any form or section which may be moved while the carriage is held stationary.

Figure 5:
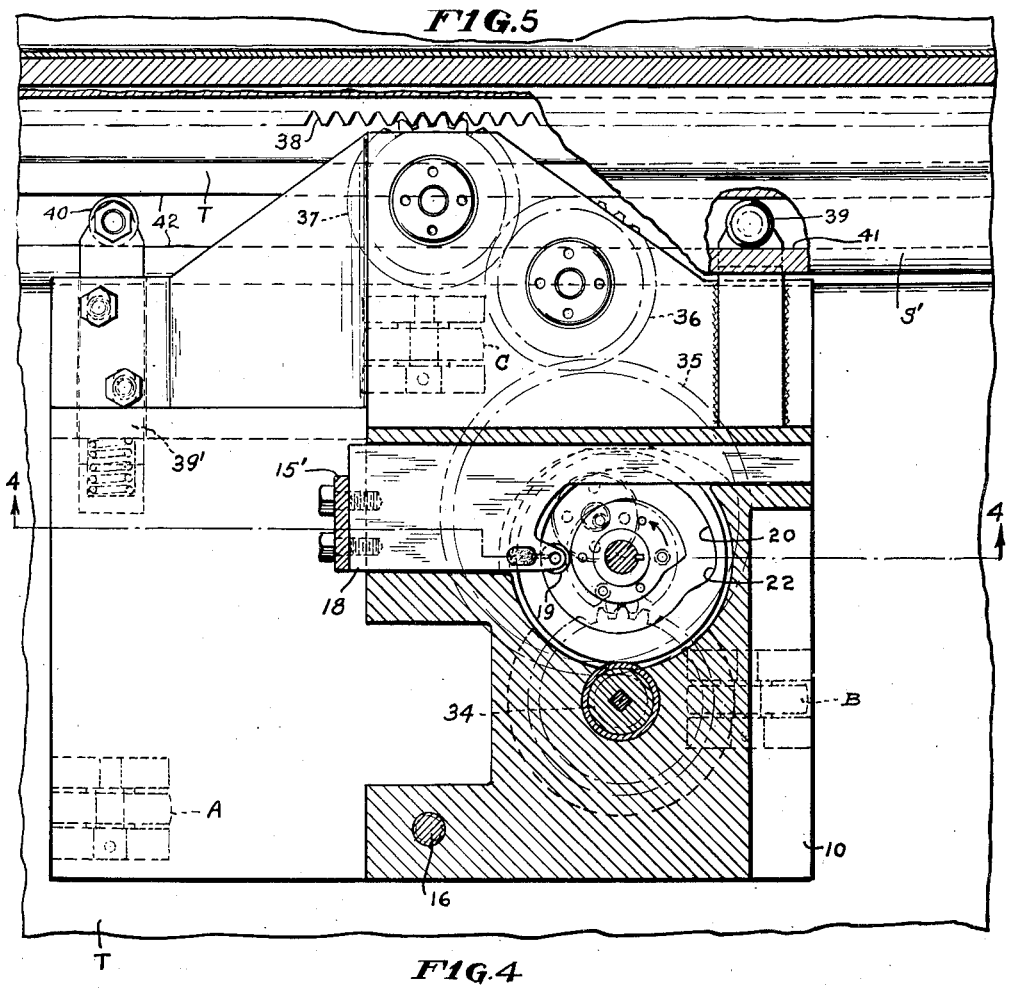
Fig. 5 is a horizontal section taken on the line 5—5 of Figs. 3 and 4.
Figure 4:
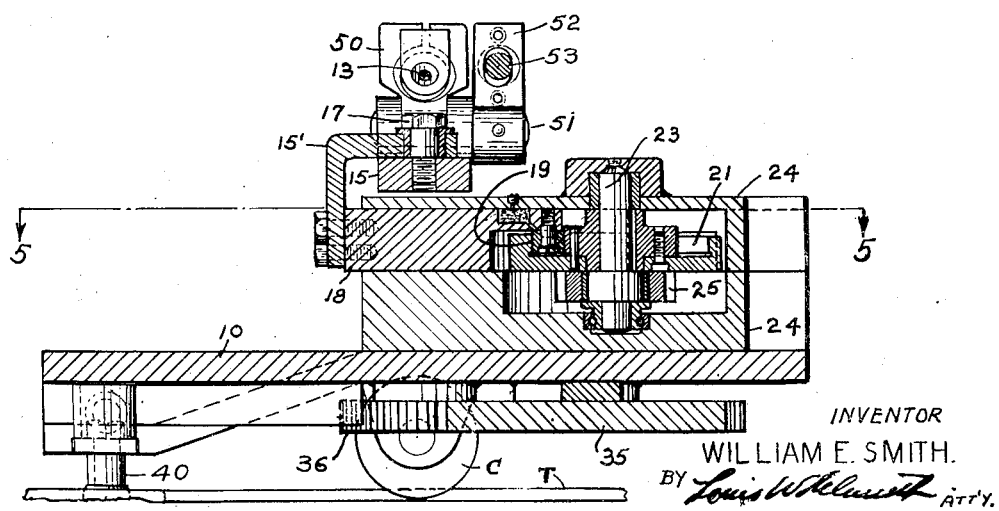
Fig. 4 is a section taken on the line 4—4 of Figs. 1 and 5.

A welding device or nozzle 14 is mounted upon the carriage and electrically charged fusible weld wire 13 from a reel suitably mounted above the carriage to one side, but not shown, is automatically fed through the nozzle by suitable feed rolls, not shown, to the joint to strike an arc with the grounded work to thereby lay a weld on the joint as the carriage is propelled across the work. The welding nozzle 14 is mounted on the free end of a horizontal oscillatory arm 15 fulcrumed at 16 at its opposite end on the carriage 10. The intermediate part of this arm is pivoted as at 17 to an L-shaped bracket 15' fastened to a cam actuated slide 18 slidably mounted on the carriage crosswise of the arm. This slide is provided with a depending roller 19 operating in a cam track or groove 20 of a rotary positive cam 21. This cam track is developed about a center with a gradual rise to a promontory to slowly swing the arm 15 and electrode nozzle 14 counter-clockwise for 330 degrees of one revolution of the cam and has an abrupt drop or dwell 22 from said promontory for 30 degrees of the cam in order to rapidly move the arm and electrode nozzle clockwise for the balance of the revolution. During one revolution of the cam, a two inch weld W is laid and a two-inch unwelded part of the joint is skipped or omitted. This is one cycle and is accomplished in the following manner. While the carriage 10 is moving to the right of Figs. 1 and 5 in a rectilinear path at a speed of say 200 inches per minute, the arm 15 with the welding nozzle is being moved counterclockwise or toward the left of the figures at a rate of travel to cause the free end of arm 15 to be moved to the left of the figures about one inch from its central position Y to a dotted line position X while the carriage is continuing to move to the right of the figures, so that the nozzle is actually moved about two inches to the right to lay a weld of that length at a speed of 100 inches per minute. When a two inch weld W has been laid on the work, the dwell or drop 22 in the cam then rapidly moves the free end of the arm 15 and welding nozzle clockwise from dotted line position X to Z and in the same direction as that of the carriage travel to the right of the figures at as high or higher speed than the carriage speed of 200 inches per minute so that the electrode cannot lay a weld, and is disposed two inches in advance of the tail end of the two inch weld just laid, ready to start welding another two inch weld again, when its speed is reduced to a welding speed by the cam starting to move the arm 15 counter-clockwise again as the carriage continues its travel to the right of the figures to start another welding cycle. These cycles are repeated in the same manner until the work has been traversed and the joint has been completely welded at intervals. Thus, the work is provided with seams, each of which is alternately welded at W and unwelded at S at equally spaced intervals of two inches. Where the modification is employed by moving the work while the carriage remains stationary, it will be obvious that the welding nozzle is moved in the same manner as described, and that since the work is moving in one direction during welding and the nozzle is moved in the opposite direction, new surfaces of the work will be progressively presented for welding at a speed less than that of the travel speed of the work. When the cam drop 22 functions, the nozzle will be moved in the same direction the work is traveling, and as fast as or faster than the work to skip welding for an interval as described above.

The cam 21 is keyed to a vertical shaft 23 journaled in bearings in the upper and lower separable halves of a gear box 24. A spur gear 25 keyed to the shaft beneath the cam, meshes with the larger gear 26, keyed to a stub shaft 27 also mounted in bearings in this gear box and having a lower end projecting beneath the carriage 10. The upper end of this shaft 27 is coupled to a drive shaft 28 mounted in bearings in a second gear box 29 mounted upon the first gear box 24. Loosely mounted upon this shaft is a worm wheel 30 meshing with a worm 30' driven by a motor M mounted on an extension platform of the carriage. To the wheel 30 is pinned one-half of a toothed clutch plate 31, the other half 32 thereof being normally pressed by spring 33 into mesh with its complementary plate 31 and is keyed to the drive shaft 28 so that the clutch plates will automatically disengage and stop the drive of the mechanism should any abnormal resistance be encountered.

Figure 1:
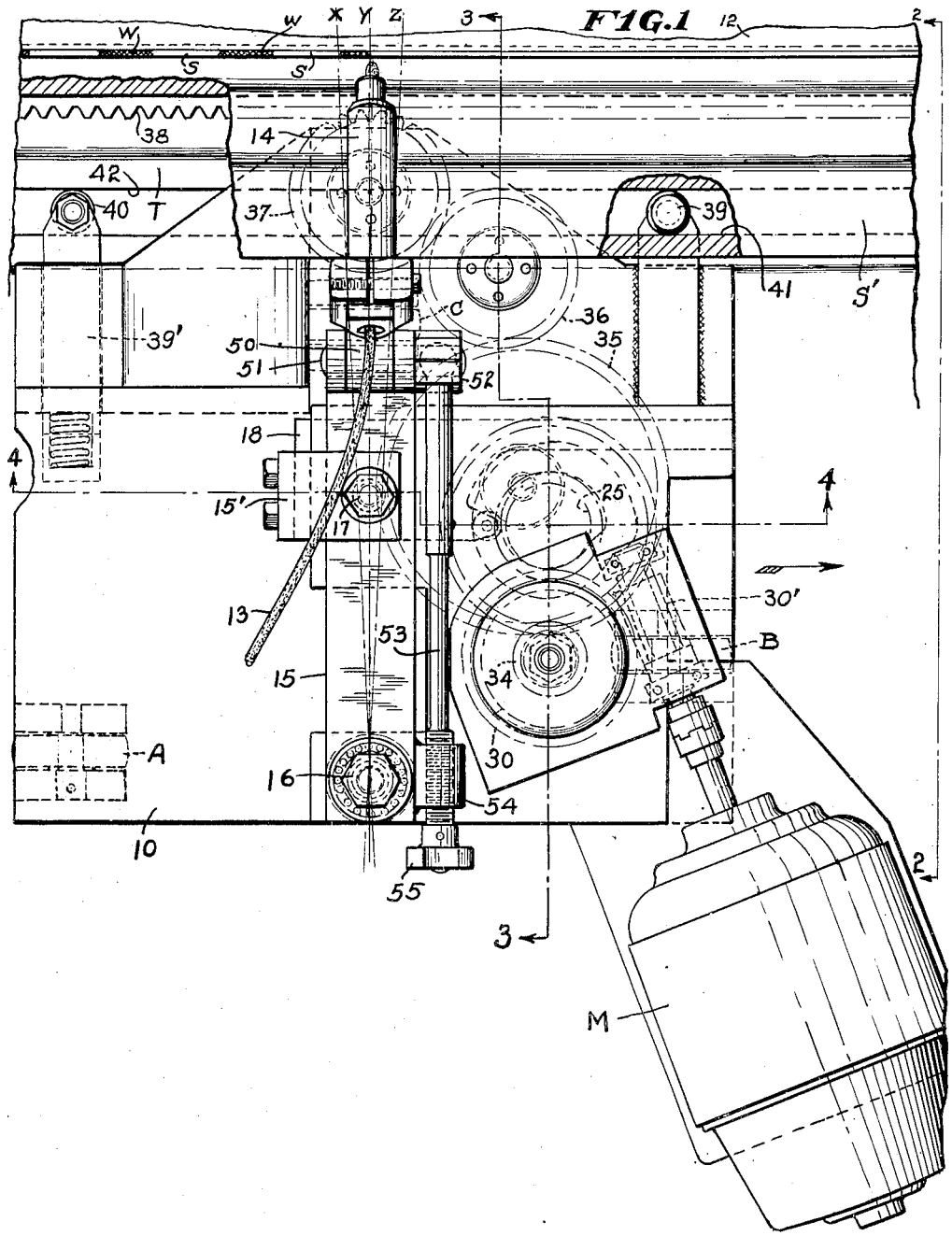

The carriage 10 is propelled at a constant speed to the right of the Fig. 1, by a train of gears consisting of a small removable spur gear 34 beneath the carriage keyed to the lower end of the stub shaft 27, a large idler meshing gear 35, a smaller meshing idler 36 and a meshing driven spur gear 37, the teeth of which project beyond the carriage to mesh with a stationary rack bar 38 fixed to the support S'. When the carriage is to remain stationary for traveling work, the gear 34 may be removed to immobilize this gear train. In order to hold the drive gear 37 in mesh with the rack 38 while the carriage is being propelled, a pair of rollers 39 and 40 are mounted on the carriage and projected one above and the other below the carriage to engage in stationary grooves 41 and 42 above and below the carriage respectively. One or both rollers may be carried in spring pressed mounting 39', as shown, to cushion shocks through the carriage when shifting its angularity to follow contour of the track T upon which the carriage is supported as described in the aforesaid patent.

The welding nozzle 14 is insulated from and is clamped in the arm of a crank 50 keyed on a shaft 51 mounted in bearings on the free end of the oscillatory arm 15. Another crank 52 is keyed to the end of the shaft 51 and is arranged vertically as best seen in Figures 2 and 3. This crank 52 is provided with a ball socket clamp into which fits the ball-shaped end of an operating rod 53 to be supported at one end thereby. The handle end of the rod 53 is supported and threadedly associated with a bracket 54 rising from the carriage so that by turning the knob 55 on the end of the rod 53, the angularity of the crank 52 and welding nozzle, and consequently that of the electrode with respect to the work will be adjusted. This is useful in adjusting the electrode to a proper distance from the work to strike and maintain an arc therewith.

From the foregoing it is believed that the operation of the apparatus will be clear. It will be understood that the opposite sides of the box section side rail 12 may be simultaneously welded by providing a duplicate apparatus on the other side of the rail and simultaneously moving them in the same direction for the entire length of the rail. The output of the apparatus can be increased by providing two of such welding instrumentalities or carriages on each side of the side rail so that all four carriages operate simultaneously, two of them completing the forward half of the side rail, and the other two completing the rear end thereof. It will also be understood that the apparatus may be caused to weld irregular shapes and contours by applying the principles of my aforesaid patent. Various changes in the relation of parts may be resorted to without departing from the scope of the appended claims.

I claim:

1. Apparatus for welding work comprising a carriage, a welder slide mounted on said carriage to move lengthwise of the direction of travel of said carriage, means to propel said carriage, an arm pivoted at one end to said carriage and at an intermediate point to said slide, a welder mounted on the free end of said arm, and a cam drive cooperating with said slide to move said slide relative to said carriage, first in the direction of movement of said carriage and then in the opposite direction while said carriage is constantly propelled in one direction.

2. Apparatus for welding work comprising a carriage adapted to be moved along the work for laying welds, means for propelling said carriage relative to said work at a speed greater than the desired speed of welding, a cam operated by said means and having a cam groove with an abrupt drop therein, a slide mounted on said carriage and movable parallel with the carriage movement, said slide having a member operating in said cam groove, an arm pivoted at one end to said carriage, a welding instrument on the free end of said arm, and said arm having its intermediate portion connected to said slide to be alternately moved in the same direction as the carriage movement and then in the opposite direction.

3. Apparatus for welding work comprising a carriage adapted to be moved along the work for laying welds, a motor on said carriage, a pair of superimposed gear boxes on said carriage, a vertical drive shaft extending through said boxes and driven by said motor, a train of gears driven by said shaft beneath said carriage to propel the same relative to said work, a cam in one of said gear boxes driven by said shaft and having a cam groove, a slide mounted on said carriage and movable parallel with the carriage movement, said slide having a member operating in said cam groove, an arm pivoted at one end to said carriage, a welding instrument on the free end of said arm, and said arm having its intermediate portion connected to said slide to be alternately moved in the same direction as the carriage movement and then in the opposite direction.

4. Apparatus for welding work at spaced intervals comprising a carriage, means including a gear train to move said carriage in one direction along the work at a constant speed, a slide reciprocable on said carriage parallel to the line of travel of the latter, a cam driven by said gear train and cooperating with said slide for so reciprocating the latter, an arm pivoted at one end to the carriage, a welder connected to the other end of said arm and projecting toward work to be welded and a bracket connecting one end of said slide with said arm between the ends of the latter.

5. Apparatus for welding work at spaced intervals comprising a carriage, means including a gear train to move said carriage in one direction along the work at a constant speed, a slide reciprocable on said carriage along the line of travel of the latter, a cam driven by said gear train and cooperating with said slide for so reciprocating the latter, an arm pivoted at one end to the carriage, a welder connected to the other end of said arm and projecting toward work to be welded, and a bracket connecting one end of said slide with said arm between the ends of the latter, said cam having a gradual rise for pivoting the welder in a direction opposite to that of the direction of travel of the carriage at a rate of travel slower than that of the carriage and a steep fall for pivoting the welder forwardly in the direction of travel of the carriage at a rate of speed greater than that of the carriage.

6. Apparatus for welding work comprising a wheel supported carriage, a work holder, a rack on the side of the work holder, means including a gear train and a spur gear engaging said rack to move the carriage along said work, an arm pivotally mounted on said carriage, a slide reciprocable on said carriage and connected to said arm, a welder mounted on the free end of said arm, a cam driven by said gear train and cooperating with said slide to reciprocate the latter and move the arm about its pivot, and interengaging means on the work holder and carriage to maintain the spur gear in mesh with said rack.

WILLIAM E. SMITH.

REFERENCES CITED

The following references are of record in the file of this patent:

UNITED STATES PATENTS

| Number | Name | Date |
| --- | --- | --- |
| 1,831,343 | Caldwell | Nov. 10, 1931 |
| 2,280,770 | Anderson | Apr. 21, 1942 |
| 2,357,376 | Baird | Sept. 5, 1944 |
| 2,404,632 | Hansen | July 23, 1946 |

FOREIGN PATENTS

| Number | Country | Date |
| --- | --- | --- |
| 377,548 | Great Britain | July 28, 1932 |